(12) United States Patent
Pershan

(10) Patent No.: US 6,834,101 B1
(45) Date of Patent: Dec. 21, 2004

(54) AIN BASED CALL RETRY AND ENHANCED CALL WAITING SERVICES

(75) Inventor: Barry Paul Pershan, Olney, MD (US)

(73) Assignee: Verizon Services Corp., Arlington, VA (US)

( * ) Notice: Subject to any disclaimer, the term of this patent is extended or adjusted under 35 U.S.C. 154(b) by 487 days.

(21) Appl. No.: 09/940,563

(22) Filed: Aug. 28, 2001

(51) Int. Cl.[7] .............................................. H04M 3/42
(52) U.S. Cl. .............................. 379/207.04; 379/207.1; 379/214.01; 379/221.08
(58) Field of Search ....................... 379/207.04, 207.05, 379/207.1, 207.13, 207.14, 207.15, 211.01, 211.02, 212.01, 215.01, 210.01, 67.1, 209.01, 214.01, 265.01–265.14, 246.01–266.1, 221.08–221.12

(56) References Cited

U.S. PATENT DOCUMENTS

| | | | |
|---|---|---|---|
| 5,440,623 A | | 8/1995 | Moore et al. .................. 379/67 |
| 5,600,710 A | * | 2/1997 | Weisser et al. ............ 379/88.19 |
| 5,844,896 A | | 12/1998 | Marks et al. ................ 370/385 |
| 5,946,684 A | * | 8/1999 | Lund ............................ 707/10 |
| 6,317,488 B1 | * | 11/2001 | DePond et al. ........... 379/93.35 |
| 6,466,653 B1 | * | 10/2002 | Hamrick et al. ............ 379/67.1 |
| 6,661,785 B1 | * | 12/2003 | Zhang et al. ................ 370/352 |
| 6,681,006 B1 | * | 1/2004 | Pilkington et al. ...... 379/210.01 |

OTHER PUBLICATIONS

US patent application No. 2001/0012291 (vERBIL et al.) Aug. 2001.*
US patent application No. 2002/0101970 (Contractor) Aug. 2002.*
US patent application No. 2003/0108172.*

* cited by examiner

Primary Examiner—William J. Deane, Jr.
(74) Attorney, Agent, or Firm—Leonard C. Suchyta, Esq.; Joel Wall, Esq.; Straub & Pokotylo

(57) ABSTRACT

AIN Monitor_For_Change functionality is used to implement an AIN based call retry service and an AIN based enhanced call waiting service. The AIN Monitor_For_Change functionality allows a service control point to obtain line status information, from a telephone switch. The same functionality used to provide the call retry service is combined with incoming call notification, and the collection of call disposition information from a called party, to provide the enhanced call waiting service. The enhanced call waiting service provides a called party on an existing call, incoming call notification with caller identification information. The called party is then provided the opportunity to accept the call, have the calling party wait, or send the call to voice mail. When the called party requests that the calling party wait, the calling party is notified of the called party's request and is connected to the called party once the ongoing call is completed.

23 Claims, 10 Drawing Sheets

AIN BASED CALL RETRY AND ENHANCED CALL WAITING SERVICES

FIELD OF THE INVENTION

The present invention is directed to communications systems and, more particularly, to methods and apparatus for providing call retry and/or call waiting services.

BACKGROUND OF THE INVENTION

Calls to busy telephone numbers are normally not billed. Accordingly, from the telephone company perspective, calls to busy telephone numbers represent an unprofitable and therefore undesirable service which they are required to provide. From the telephone company's perspective, increased rates of successful call completion can have a direct impact on profitability.

From a calling party's perspective uncompleted calls to busy telephone numbers are also undesirable since the call must be repeated if the calling party is to ultimately reach the called party. In order to help a calling party, some private branch exchange (PBX) equipment has been implemented which includes an automatic repeat call feature. This feature allows a calling party to have the PBX repeatedly place a call to a telephone number entered by the calling party, at periodic intervals, until the called line is no longer busy and the call is answered.

While such repeated automated dialing can be useful to the calling party, such an approach to a call retry service requires special hardware at the caller's premises. In addition the PBX based call retry service has the disadvantage of producing numerous calls which must be handled by the public telephone network but which can not be billed for since they are not successfully completed to the called party's line.

Various premium services, e.g., call waiting services, have been offered to telephone service subscriber's to allow them to interrupt an ongoing call and accept a call. This allows at least some calls, which would otherwise not be completed due to a busy line condition, to be completed successfully.

With call waiting services, the telephone switch which services the called party usually generates a call waiting tone in response to an incoming call directed to a busy line with call waiting service. In response to the call waiting tone, the called party can put the existing call on hold by performing a hook flash operation, i.e., briefly depressing and then releasing the phone hook. In response to this hook flash, the calling party is connected to the called party while the previous caller is placed on hold.

In order to give the called party the opportunity to make an educated decision as to whether or not to interrupt an ongoing call for an incoming call, in one premium call waiting service known as Talking Call Waiting, an audio version of the name of the calling party is played to the called party after the call waiting tone. The name played to the called party is obtained using ANI techniques.

Unfortunately existing call waiting services are limited to providing the called party the opportunity to take or reject a call while on an existing call. It would be nice if the called party, e.g., the call waiting service subscriber, could have a larger range of call disposition options, e.g., it would be desirable for the called party to have the option of asking the calling party to wait until the existing call is completed or to send the incoming call to a voice mail system, e.g., answering machine.

Significantly, there is currently no network based way to have a calling party wait for an extended period of time for a called party to hang up, and then have the calling party automatically connected to the called party.

In order to provide enhanced telephone services, many telephone companies now implement a telephone communications network as an Advanced Intelligent Network (AIN) which has made it easier to provide a wide array of previously unavailable telephone services. In an AIN system, telephone central offices each include one or more switches, each of which serves as a signal switching point (SSP). Each SSP can detect one of a number of call processing events identified as AIN "triggers" or events. An SSP which detects a trigger suspends processing of the call which activated the trigger, compiles a call data message and forwards that message via a common channel interoffice signaling (CCIS), utilizing the Signal System 7(SS-7) protocol, link to a database system, such as a Service Control Point (SCP). The SCP may be implemented as part of an integrated service control point (ISCP). If needed, the SCP can instruct the central office SSP at which the AIN trigger was activated to obtain and forward additional information, e.g., information relating to the call. For example, AIN supports a Monitor_for_Change message which can be sent to an SSP. In response to the Monitor_for Change message, the SSP checks on the status of the line associated with the message and reports that line status back to the SCP.

The SCP accesses stored call processing information or records (CPRs) to generate from the data received from the SSP one or more control messages. The call control messages are used to instruct the central office on how to process the call which activated the AIN trigger. As part of the call control message, an ISCP can instruct the central office to send the call to an outside resource, such as an intelligent peripheral (IP) using a send to outside resource (STOR) instruction. IPs are frequently coupled to SSPs to provide message announcement capabilities, voice recognition capabilities and other functionality which is not normally provided by the central office. Control messages are normally communicated from the SCP to the SSP handling the call via a CCIS/SS-7 link. The SSP will complete the call which originally activated the AIN trigger in accordance with the instructions received in the control message received from the SCP.

Given that telephone companies have made significant investments in implementing AIN, they are constantly looking for new services, which can be offered using AIN capabilities, e.g., services for which they can charge customers or which reduce the costs associated with servicing existing customers.

To facilitate telephone system and computer system interaction, a TAPI (telephone application programming interface) has begun to be supported by Microsoft Corporation and other computer software providers. TAPI is intended for use by computer systems and other electronic devices which are coupled to a telephone device thereby allowing the attached electronic device and/or computer to receive signals communicated over a telephone line and to send signals from the attached device and/or computer to the attached telephone device. TAPI signaling can be used to communicate text information to a TAPI device, e.g., during an ongoing telephone call.

In view of the above discussion, it should be apparent that it would be desirable if the telephone network could offer a network based, as opposed to customer premise, e.g., PBX, based call retry service. Improved call waiting services which offer a called party multiple call disposition options are also desirable. The combination of a call waiting service with a call retry service whereby a caller to a busy line could be asked to hold while the called party completes an existing call is particularly desirable.

SUMMARY OF THE INVENTION

The present invention is directed to methods and apparatus for providing call retry and/or call waiting services using AIN functionality including, e.g., AIN Monitor__For__Change functionality.

AIN Monitor__For__Change functionality allows a service control point (SCP) to request and obtain line status information from a telephone switch. In accordance with the present invention, an AIN based call retry service is provided using Monitor__For__Change functionality.

In one exemplary embodiment of the retry service, an AIN trigger, e.g., TAT trigger, is used to invoke SCP control when a call is received. The SCP instructs the telephone switch (SSP) at which the trigger was activated to try and complete the call to the called party and to notify the SCP of the results of the call completion attempt. If the call can not be completed because the called party's line is busy, the switch notifies the SCP of the failure to complete the call due to a busy line condition.

In response to the information that the call was not completed due to a busy line condition, the SCP instructs the telephone switch to send the call to an intelligent peripheral device (IP) which plays the calling party a message and provides the calling party an opportunity to wait for the called party to complete the ongoing call or to leave a message for the called party.

Assuming the calling party decides to wait for the called party to complete the existing call, the IP will periodically signal the SCP to resume call processing. Each time the SCP resumes call processing it checks on the status of the called party's line using the AIN monitor for change functionality.

If, in response to the line status check, the SCP receives status information indicating the called line is no longer busy, the SCP will instruct the switch to complete the call to the called party's line, e.g., using AIN Offer__Call functionality. If the returned line status information indicates the called line is busy, the SCP will increment a call retry count. The call retry count is then checked to determine if it has reached a maximum value corresponding to the maximum amount of time a call party is allowed to wait before being transferred to voice mail.

If the retry count has not reached the maximum value the SCP has the call reconnected to the IP where the caller may again be given the opportunity to go to voice mail or continue to wait. Once a set amount of time at the IP has passed, the IP will signal to the SCP via the switch to resume call processing, e.g., to check on the line status again in an attempt to complete the call.

When the retry count has reached the maximum permitted value, the SCP will cause the call to be transferred to the called party's voice mail. The transfer may be preceded by the IP playing the called party a message indicating that the called party is still busy on another call so they are being transferred to the called party's voice mail.

The AIN based enhanced call waiting service of the present invention combines incoming call notification and called party call disposition selection features with the ability to hold an incoming call until an existing call is completed.

In accordance with one exemplary call waiting embodiment, incoming calls to enhanced call waiting service subscribers activate an AIN trigger at the terminating telephone switch which services the called party. In response to activation of the AIN trigger, an SCP is contacted by the switch for call processing instructions. If the SCP determines that the called party's line is busy, the SCP initiates notification of the incoming call to the call waiting subscriber. The incoming call notification may be achieved using TAPI Display__Text functionality for subscriber's which have a TAPI device, using talking call waiting speech notification capabilities supported by the telephone switch or by Internet notification via the transmission of an incoming call notification message to the call waiting service subscriber's computer via the Internet.

In addition to being provided with the identity of the incoming caller, the called party is presented with the opportunity to indicate how they want the incoming call to be handled. The called party may indicate, e.g., by using a computer to send a message via the Internet, that they want to 1) take the incoming call; 2) have the caller wait; or 3) to send the call to voice mail. In the exemplary embodiment, the called party's call disposition selection is communicated from the called party's computer to an Internet customer access server which relays the disposition information to the SCP.

If the SCP receives information indicating that the called party wants to take the incoming call, the SSP is instructed to offer the call to the called party who can than accept it by putting the first call on hold by briefly depressing the switch hook. If, however, the SCP receives information indicating that the call is to be transferred to voice mail or fails to receive call disposition information from the called party, the SCP will cause the SSP to transfer the call to a voice mail system which services the called party.

If the SCP receives information indicating that the called party wants to have the calling party wait until the ongoing call is completed, the SCP sends the incoming call to an IP. The IP plays the calling party a message, e.g., indicating that the called party is on another call and has requested that the calling party wait until they finish the ongoing call. After a set interval of time, the IP signals the SCP to continue call processing. The SCP responds by sending a message to the SSP to check the status of the called line.

If the line status information returned by the SSP to the SCP indicates that the called line is no longer busy the SCP instructs the SSP to complete the call to the called line.

However, if the line status information returned by the SSP to the SCP indicates that the called line is still busy the SCP will increment a call retry count. The value of the call retry count, is then compared to a maximum retry count value. The maximum retry count value is indicative of a set maximum period of time a caller will be kept waiting before being sent to voice mail. If the call retry count has not reached the maximum value the call will be reconnected to the IP to wait for the set period of time. Once the set amount of time at the IP has passed, the IP signals to the SCP via the SSP to resume call processing, e.g., to check on the line status again in an attempt to complete the call.

When the retry count has reached the maximum permitted value, the SCP will cause the call to be transferred to the called party's voice mail. The transfer may be preceded by the IP playing the called party a message indicating that the called party is still busy on another call so they are being transferred to the called party's voice mail. As part of the call transfer operation, the SCP may instruct the SSP to notify the called party that the waiting caller has been transferred to voice mail. In the case of notification via the SSP, the notification may be in the form of a text message displayed using a TAPI device located at the called party's location.

In the above described manner, the same functionality used to provide the call retry service of the invention is combined with incoming call notification, and the collection of call disposition information from a called party, to provide the enhanced call waiting service of the present invention.

The AIN based call retry service and the AIN enhanced call waiting service of the present invention can be offered in conjunction with other AIN and/or switch based services. For example, the services of the present invention can be combined with, and offered to, both switch based and AIN based Centrex service subscribers.

Accordingly, the call retry service and enhanced call waiting service of the present invention provide an opportunity for a telephone service provider to increase the number and/or types of services provided to customers.

Various additional features and advantages of the present invention will be apparent from the detailed description which follows.

DETAILED DESCRIPTION

As discussed above, the present invention is directed to methods and apparatus for implementing network based call retry services and enhanced call waiting services.

Figure 1:
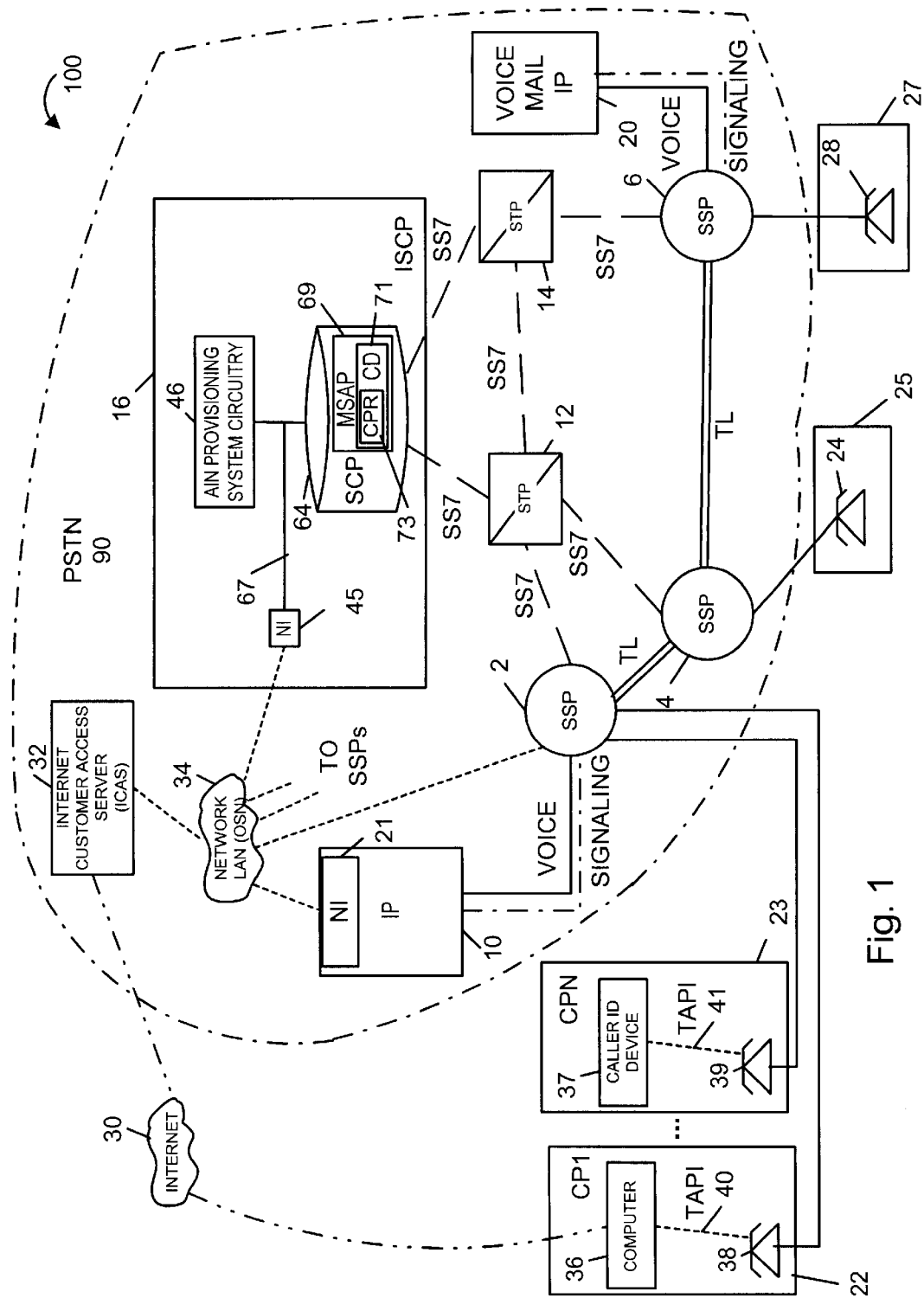
FIG. 1 illustrates a communication system implemented in accordance with an exemplary embodiment of the present invention.

FIG. 1 illustrates a communication system 100 implemented in accordance with an exemplary embodiment of the present invention. The system 100 supports communications via the Internet 30, as well as a public switched telephone network (PSTN) 90. The PSTN 90 includes a plurality of signal switching points (SSPs) 2, 4, 6, a plurality of signal transfer points (STPs) 12, 14, an integrated service control point (ISCP) 16, an Internet customer access server (ICAS) 32, an intelligent peripheral IP 10, and a Voice mail IP 20. The PSTN 90, in accordance with the present invention, also includes a local area network 34.

Each SSP 2, 4, 6 is implemented using at least one switch. The SSPs 2, 4, 6 may be implemented using known Class V telecommunications switches capable of supporting the Signaling System Seven (SS7) protocol. Each SSP 2, 4, 6 corresponds to a different telephone central office. Trunk lines (TL), which may be implemented using fiber optic cables, interconnect the various SSPs 2, 4, 6.

Each SSP 2, 4, 6 is normally connected to one or more customer premises (CPs) which may include, e.g., telephone service subscriber residences and/or offices. In the FIG. 1 example, first and second customer premises 22 and 23 are coupled to the second SSP 2. Additional customer premises 25, 27 include telephones 24, 28, respectively. Telephone 24 is coupled to SSP 4 while telephone 28 is coupled to SSP 6. Connections between the SSPs and CPs may be by POTS lines, ISDN lines, DSL, or other known communications lines.

Communications equipment, referred to as customer premise equipment (CPE) is located at each customer premises 22, 23, 25, 27. Customer premise equipment may include, e.g., telephones, faxes, computers, TAPI capable caller ID boxes, etc. In FIG. 1, a computer 36 and land-line telephone 38 are shown as being located at the first customer premises 22. As will be discussed below, each of these devices corresponds in the exemplary embodiment shown in FIG. 1 to a first telephone service subscriber. The computer 36, located at the first customer premises 22 is coupled by any one of a plurality of known connection techniques, e.g., telephone dial-up, ISDN, DSL, etc., to the Internet 30, also known as the World Wide Web. The computer 36 and telephone 38 are coupled together by a communications link 40 which supports the known TAPI interface. Via TAPI, the computer 36 can initiate various telephone operations and receive voice calls via SSP 2 and telephone 38. In addition, SSP 2 can transmit text messages to the computer 36 over the telephone connection and, using TAPI, cause the computer 36 to display the received messages.

The caller ID device 37 and telephone 39 located at the Nth customer premises 23 are coupled together by communications link 41 in the same manner that computer 36 and telephone 38 are coupled together. The Caller ID box may be connected in series with the telephone line. In many cases the caller ID may be part of the telephone itself. The caller ID box does not require use of a TAPI interface. In the exemplary embodiment, caller ID device 37, can be controlled by a telephone switch to display text messages in addition to the caller's telephone number and name.

While the third and fourth customer premises 25, 27 are illustrated as including only landline phones, it is to be understood that they may have any number of communications devices including, e.g., telephone, fax, and computer devices. For purposes of explanation, it will be assumed that the first customer premises 22 corresponds to a first telephone service subscriber while the second customer premises 23 corresponds to a second telephone service subscriber. Additional telephone service subscribers may be coupled to any one of the SSPs 2, 4, 6.

The system 100 is implemented using AIN techniques. Accordingly, the processing of calls directed to a customer's telephone line and received by an SSP from a telephone customer's line may be controlled by instructions included in customer call processing records (CPRs). In the system 100, the CPRs are stored at the Integrated Services Control Point (ISCP) 16. In the exemplary embodiment, one CPR exists for each subscriber to an AIN based service. A customer's CPR is accessed in response to activation of an AIN trigger set at, e.g., the SSP 2, 4, or 6 to which the telephone line or lines to the subscriber's customer premises are connected.

The ISCP 16 includes an SCP 64, an AIN provisioning system 46 and a network interface (NI) 45. A local network 67 couples the various components of the ISCP 16 together.

The network interface 45 couples the ISCP 16 to various other components of the telephone network 100 via a TCP/IP based network referred to as an operational services network (OSN) 34. The OSN 34 connects the ICAS 32, SSPs 2, 4, 6, Intelligent Peripherals (IPs) 10, 20, and the ISCP 16 together. Thus, the OSN 34 is a network over which control and signaling information can be passed between the various telephone network system components, e.g., using TCP/IP.

In addition to being connected to the OSN 34, ISCP 16 is connected, via its SCP 64, to the SSPs via one or more signal transfer points (STPs) 12, 14 and Signaling System Seven (SS7) interconnects over which messages, data, and requests for call processing control instructions can be communicated between the SSPs 2, 4, 6, and ISCP 16.

The SCP 64 includes a multi-service application platform (MSAP) database 69 which includes customer data (CD) 71 for each of a plurality of Centrex and/or other AIN based service subscribers. The customer data 71 includes, for each customer: 1) a list of the services to which the customer subscribes; 2) a password which may be input via DTMF signals; and 3) a call processing record (CPR) which is used to instruct an SSP how to process a call in response to an AIN trigger to thereby implement the services to which the customer subscribes. Exemplary services which may be supported by the ISCP 16 include, e.g., an AIN based call retry service, AIN based enhanced call waiting, voice dialing, voice mail and a host of other services which may be provided to AIN service subscribers.

The services of the present invention can be provided to non-Centrex telephone customers as well as Centrex service subscribers.

The customer data 71, which includes call processing records 73, is generated, at least initially, by the AIN provisioning system 46 in response to input received from a service representative or operator. Customer data in the database 71 may, after initial provisioning of a service for a customer, may be updated by the customer via the Internet and the use of a Web browser by way of the ICAS 32. The ICAS 32 can access and modify, subject to security constraints, the contents of the customer data 71.

Among other things, the AIN provisioning system circuitry 46 is responsible for setting and/or updating AIN triggers, including mid-call triggers, at the various signal switching points (SSPs) required to implement AIN based services to the subscribers. In addition to setting AIN triggers, the AIN provisioning system circuitry 46 is responsible for generating and/or updating customer data, e.g., call processing records 73, and other information stored in various locations in the system 100, as required to implement a service order. As will be discussed below, various IPs 10, 20 are used to provide services to telephone service subscribers. Thus, in addition to updating information in the customer database 71, the AIN provisioning system circuitry 46 is responsible for updating information in the various IPs 10 and 20. The updating of the IPs and the setting of AIN triggers can be performed by the AIN provisioning system circuitry 46 through communications with the various system components conducted using the OSN 34 and/or via SS7 links to the ISCP 16.

Once service to a customer has been initially configured, a service subscriber can, in accordance with the present invention, update various service information though the use of a personal computer and a Web Browser application, various known browsers include Internet Explorer and Netscape. In the FIG. 1 system, the service subscriber to whom the first customer premises 22 corresponds can update the subscriber's information via the use of computer 36 and an Internet connection.

The ICAS 32 serves as a secure gateway via which telephone service subscribers can update and configure their AIN telephone service information using a computer coupled to the Internet. The ICAS 32 includes security routines, e.g., a firewall, designed to prevent individuals other than the subscriber gaining access to and/or modifying via the Internet, subscriber service information. The ICAS 32 is coupled to the OSN 34 thereby allowing a customer, upon satisfying various security checks, to access and modify service information stored in any one of the various network devices, e.g. ISCP 16, and/or IP 10, 20, coupled to the OSN 34. For example, via the Internet and the ICAS 32, a subscriber can update schedule information stored in IP 10 which determines which of a plurality of recorded voice messages are to be presented to callers encountering a busy line condition, as a function of time and/or date information.

In order to implement various services, such as call retry, enhanced call waiting, and voice mail IPs 10, 20 are used. The first IP 10 is an interactive voice response (IVR) IP which is capable of recording and playing messages, performing speech recognition and DTMF signal detection operations, as well as playing voice prompts and providing call timer functionality.

IVR IP 10 is coupled to the first SSP 2 via audio (voice) and signaling lines. It is also coupled to the OSN 34 through a network interface (NI) 21. In this manner, the IVR IP 10 can interact with other components of the system 100, e.g., ISCP 16, via communications transmitted over OSN 34 or through the SSP 2. The IVR IP 10 may be implemented using known hardware.

In the exemplary embodiment, the IP 10 is used, in conjunction with AIN control logic, to provide a call retry and enhanced call waiting services.

Information stored in the IP 10, e.g., individual subscriber's recorded messages to be used as prompts and message schedule information, can be updated through a telephone connection to the IP 10 in addition to an Internet connection via ICAS 32. A service subscriber can establish a service updating or management session with the IVR IP 10, by dialing a telephone number associated with the IP 10. Dialing of the IP's telephone number results in the subscriber's call being routed to SSP 2 and a voice/DTMF connection to the IVR IP 10 being established.

IVR 10 includes various security features, e.g., customer identification and password entry requirements, as does the ICAS 32, to insure that customers are limited to accessing and updating their own service records and not those of other telephone service subscribers.

Voice mail IP 20, coupled to SSP 6, can be used to provide voice mail services to call retry and enhanced call waiting telephone service subscribers. Alternatively, IP 10 can be used to provide voice mail capability in addition to call retry and enhanced call waiting functionality.

Figure 2:
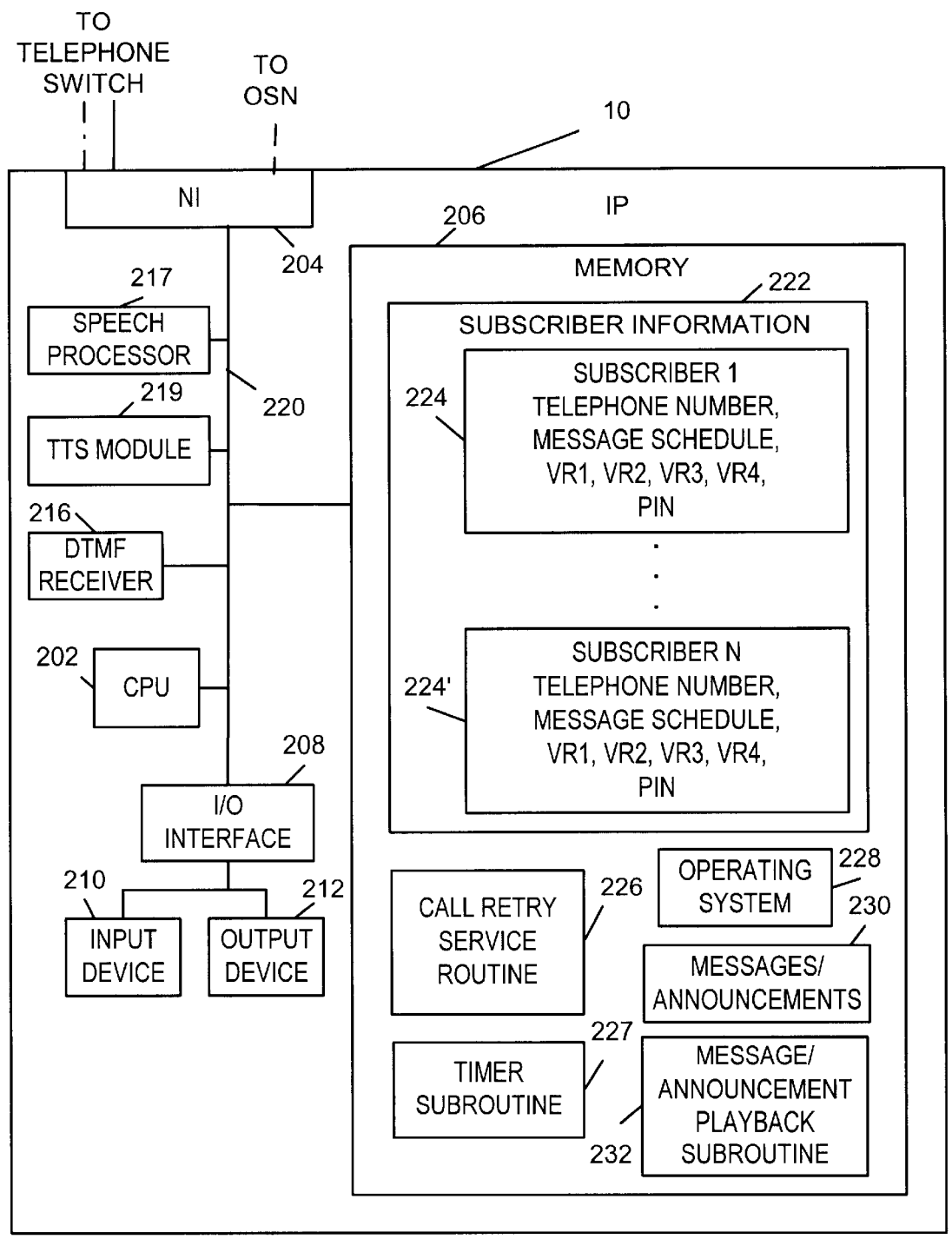
FIG. 2 illustrates an intelligent peripheral device suitable for use in the communication system of FIG. 1.

FIG. 2 illustrates an exemplary IP 10. The IP 10 includes input/output (I/O) interface 208, text to speech module 219, speech processor 217, DTMF receiver 216, network interface 204, memory 206 and central processing unit (CPU) 202, which are coupled together by bus 220. I/O interface 208 is coupled to an input device 210, e.g., keyboard, and an output device 212, e.g., display. Using input and output devices 210, 212 a local system administrator can control IP operation, e.g., for system maintenance. Network interface 204 couples the IP 10 to the OSN 34 and telephone switch 2. This allows the IP 10 to receive and send messages to and from devices coupled to the networks such as the ISCP 16 and the subscriber's computer 36.

The TTS module 219 provides a text to speech capability for providing audible versions of text data, e.g., of names retrieved as party of a caller ID lookup operation, to the called party. The DTMF receiver 216 is used to detect DTMF input from a party connected to the IP 10, e.g., in response to menu prompts or as part of PIN entry procedure. The speech processor 217 is capable of making voice recordings and providing speech recognition capability. Thus the speech processor 217 gives the IP 10 the capability of recording one or more custom messages for each enhanced call waiting service subscriber serviced by the IP 10.

The memory 206 includes a set of subscriber information 222, a call retry service routine 226, a timer subroutine 227, operating system 228, pre-recorded messages/announcements 230 and a message/announcement playback subroutine 232. The set 222 of subscriber information includes, for each of a first through Nth service subscriber, a set of subscriber information 224, 224'. Each set of subscriber information 224, 224' includes a subscriber identifier, the subscriber's telephone number, message schedule information, one or more voice recordings VR1, VR2, VR3, VR4, and a PIN which is entered to gain access to the corresponding set of subscriber information.

The CPU 202 controls operation of the IP 10 under control of the operating system 228 and the call retry service routine 226 stored in memory 206. Routine 226 includes a plurality of computer instructions for controlling various telephone service operations and may call upon timer subroutine 227 and message/announcement playback subroutine 232 as required. Under control of the routine 226 the CPU 202 controls the IP 10 to interact with various other system components including the ISCP 16 as well as subscribers who call in to update their subscriber information. Operations performed by the IP 10 will be discussed further in regard to the flow charts that follow.

Figure 3:
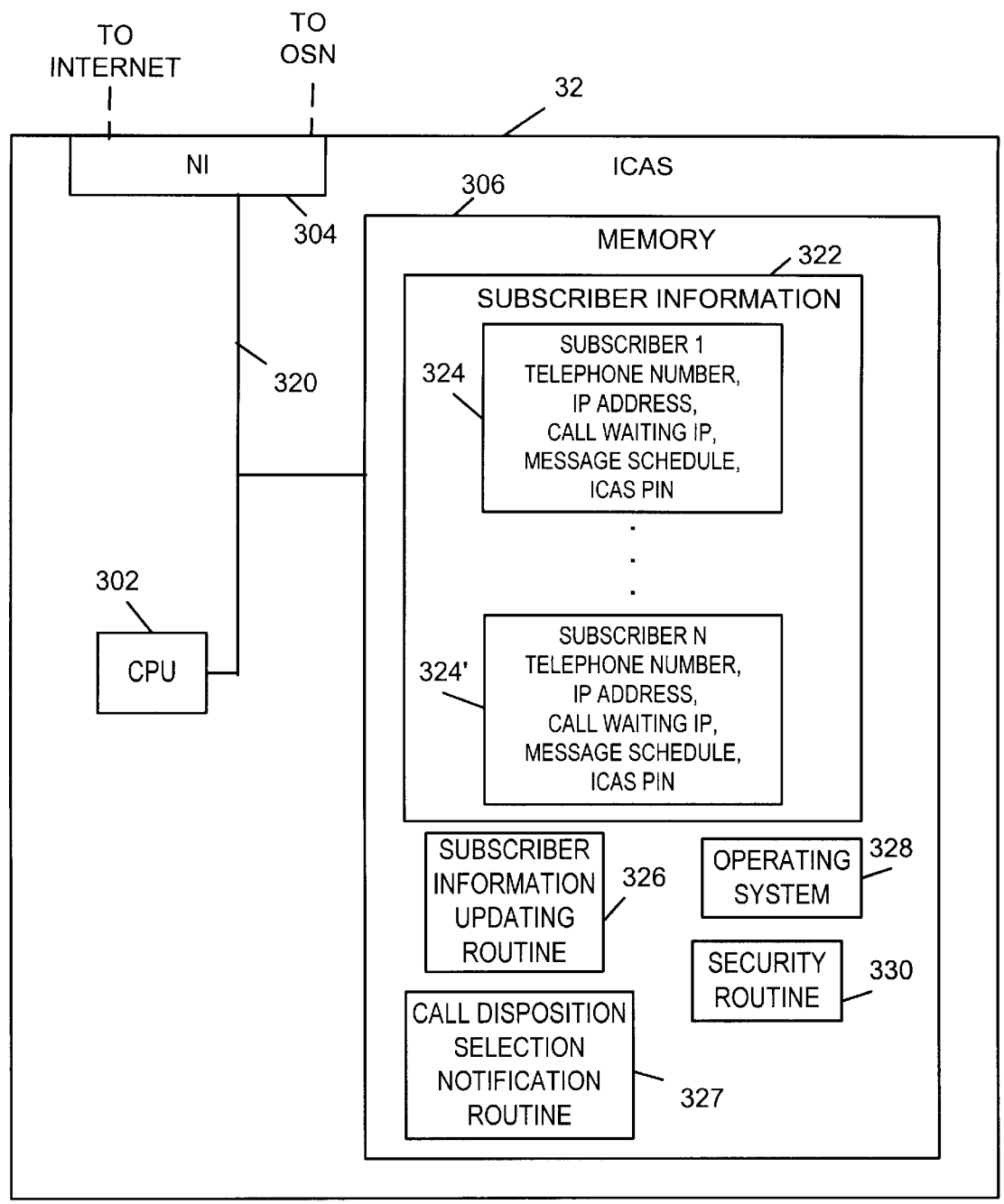
FIG. 3 illustrates an Internet customer access server suitable for use with the system of FIG. 1.

FIG. 3 illustrates an Internet connection access server 32 suitable for use in the system of FIG. 1. The ICAS 32 includes a network interface 304, CPU 302 and memory 306 coupled together by bus 320. The network interface connects the ICAS to the Internet 30 and OSN 34. Thus, the ICAS 32 can interact with telephone service subscribers via the Internet 30 and PSTN components as the ISCP 16 and IP 10 via OSN 34. ICAS operation is controlled by CPU 302 operating under direction of routines and information stored in the memory 306. The memory 306 includes subscriber information 322, a subscriber information updating routine 326, call disposition selection notification routine 327, operating system 328, and security routine 330. The subscriber information 322 includes, for each telephone service subscriber serviced by the ICAS 32, a set of information 324, 324'. Each set of information 324 includes a subscriber identifier, the subscriber's telephone number, an IP address associated with the subscriber, information identifying the IP used to provide enhanced call waiting service to the subscriber in accordance with the present invention, a message schedule, and a PIN which must be entered by the subscriber before the subscriber is allowed to update any of the information 324, e.g., via the Internet 30.

Subscriber information updating routine 326 is invoked when a subscriber wants to update the subscriber information 324, e.g., the message schedule which determines which stored message will be used at various times/dates, using the Internet. The subscriber information updating routine 326 calls security routine 330 which compares a PIN entered by the subscriber to the stored ICAS PIN prior to allowing the subscriber to access or update his/her information 324. After the security check is satisfied, the information updating routine 326 will allow the service subscriber to modify the information 324 as desired. Thus, the subscriber may alter the time at which particular pre-recorded messages stored in the IP 10 are used as call waiting prompts. For example, the subscriber may designate one set of messages to be used for weekdays and another set of messages to be used on weekends and/or after the close of business hours.

Call disposition selection notification routine 327 is executed on a continuous basis while the ICAS 32 is in operation. The routine 327 is responsible for detecting messages from enhanced call waiting service subscribers over the Internet indicating the disposition treatment to be applied to an incoming call directed to the subscriber. In the exemplary embodiment, call disposition messages are transmitted by the subscriber's computer system to the ICAS 32.

In order to allow the ICAS 32 to associate an incoming disposition message with a particular service subscriber the disposition message includes the subscriber's unique identifier and/or telephone number in addition to the subscribers IP address and the disposition information to be conveyed to the appropriate IP 10 and/or SCP 64. In response to detecting the receipt of a call disposition message, the ICAS 32 correlates the message to a particular set of subscriber information 324, 324' using the subscriber identifier, telephone number and/or IP address included in the received message. The IP and/or SCP assigned to service the subscriber who sent the disposition message is then identified from the set of stored subscriber information 324 found to correspond to the subscriber. With the correct IP and/or SCP identified, the disposition information is transmitted to the identified IP and/or SCP which is then responsible for performing the next step in implementing the subscriber's disposition selection. Message schedule information may be transmitted from the ICAS 32 to the IP 10 when updates are made or along with call disposition information.

Figure 4:
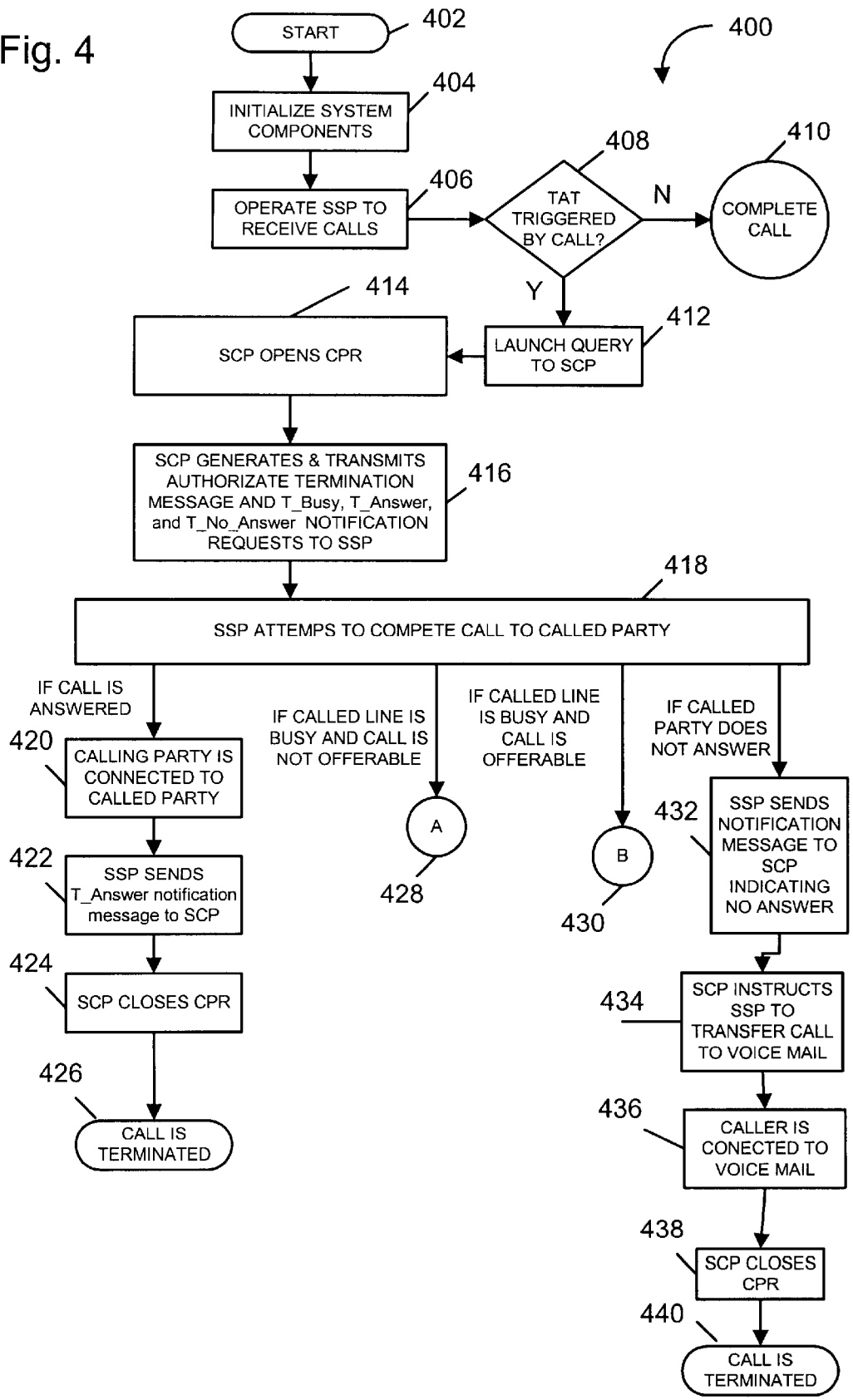
FIG. 4 illustrates a process of providing a network based call retry service and enhanced call waiting service.

The call retry and enhanced call waiting methods of the present invention will now be described with reference to FIGS. 4–8. FIG. 4 illustrates the steps associated with providing a plurality of AIN based services in accordance with the present invention. Depending on the service to be provided to an individual caller and/or enhanced call waiting subscriber, operation may proceed from the FIG. 4 to either the flow chart shown in FIG. 5 which illustrates the steps of the call retry service of the present invention or to FIG. 6 which illustrates the steps involved in providing an enhanced call waiting service in accordance with the invention. As will be discussed below, call notification processes 700 and 800 may be invoked by the enhanced call waiting service process 600 to notify an enhanced call waiting service subscriber of an incoming call.

The AIN based telephone service process 400 of the present invention shown in FIG. 4 starts in step 402 e.g., with the system components being activated and customer service information being collected. Operation proceeds from step 402 to initialization step 404. In step 404 telephone system components are initialized to provide call retry and enhanced call waiting services to subscribers in accordance with the invention. The initialization process includes, e.g., generating customer CPRs 73, setting of AIN triggers, e.g., TAT triggers in the SSPs 2 and loading of information, e.g., announcements and individual customer information including PINs, into the IP 10, for customers to be provided with the call retry and/or enhanced call waiting services of the present invention.

Once system initialization is complete, in step 406, the SSP 2 is operated to receive calls. Step 406 is performed on an ongoing bases so that individual calls will be processed as they are received. Multiple calls may be processed in parallel by the SSP 2 as well as the SCP 16. In fact, multiple calls to the same telephone number may be serviced in parallel with, in some cases, the processing of a call depending on the services to which a called party subscribes and whether or not the called party is already involved with one or more calls which have not yet ended, e.g., terminated.

As each call is received, in step 408 the terminating SSP 2, i.e., the SSP which couples the customer premise 22, 23 corresponding to the called telephone number, to the PSTN 90, checks to determine if an incoming call activates an AIN trigger. If no trigger is set on the called party line, e.g., because the called party is not being provided with the call retry or enhanced call waiting services of the present invention, operation proceeds to step 410 wherein the call is allowed to complete in the normal manner.

However, if in step 408 it is determined that a TAT is set on the line corresponding to a called telephone number, call processing is halted as the SSP 2 and a query, e.g., a TCAP message, is sent to the SCP 64 for call processing instructions. In response to the message, in step 414, the SCP opens a CPR 73 corresponding to the called party number indicated in the received TCAP message. Based on control logic included in the accessed CPR 73, in step 416 the SCP generates and transmits to the SSP 2, a reply message which authorizes the SSP 2 to try and complete the call to the called party number and, using AIN next event list (NEL) functionality requests that the SSP 2 report back to the SCP if a busy condition is encountered, the call is answered or if there is no answer within a fixed period of time, e.g., 20 seconds.

In response to the message received from the SCP 64, in step 418 the SSP 2 tries to complete the incoming call to the called party. Call processing from step 418 will proceed along any one of four different processing paths depending on: 1) the status (busy or not busy) of the called party line, 2) whether a busy called party has call waiting, making the call offerable despite a busy line condition; and/or 3) on the response from the called party, e.g., whether or not the called party answers an incoming call.

If the called party's line is not busy and the called party answer's the incoming call, operation proceeds from step 418 to step 420. In step 420 the calling party is connected to the called party by SSP 2, e.g., in response to the call being answered. Operation then proceeds to step 422 wherein the SSP sends a message to the SCP indicating that the call was answered. In response to receiving the message indicating that the call was answered, the SCP closes the CPR 424 used to control processing of the call. Then, in step 426 the call is allowed to terminate in a normal manner, e.g., the two parties talk for a period of time until one of the parties to the call hangings up ending, i.e., terminating, the call.

If the SSP 2 determines that the call it attempts to complete to the called party line in step 418 is not offerable because the called party line is already busy on two calls or because the called party does not have call waiting. Operation proceeds from step 418, via connecting node A 428, to the first step 530 of the call retry service shown in FIG. 5. The call retry service 500 will be described in detail below.

If the SSP 2 encounters a busy line condition when trying to complete the call to the called party's line but determines that the call is offerable, e.g., because the called party subscribes to the enhanced call waiting service of the present invention, operation proceeds from step 418, via connecting node B 430, to the first step 602 of the enhanced call waiting service 600 shown in FIG. 6. The enhanced call waiting service 600 will be described in detail below.

If the SSP 2 does not encounter a busy line condition when trying to complete the call to the called party's line but the called party fails to answer, operation proceeds from step 418 to step 432. In step 432 the SSP 2 notifies the SCP 16 that a no answer condition was encountered when trying to complete the call. In response to the no answer notification, in step 434 the SCP 16 instructs the SSP 2 to transfer the call to voice mail, e.g., by sending the call to voice mail IP 20. In response to the message, the SSP 2 connects the incoming call to the voice mail IP 20 which provides the caller the opportunity to leave a voice message for the called party. With the caller having been sent to voice mail, the SCP 16 closes the CPR 73 in step 438. Then, in step 440, the call is allowed to terminate in the usual manner, e.g., with the caller disconnecting after leaving a message for the called party.

Figure 5A:
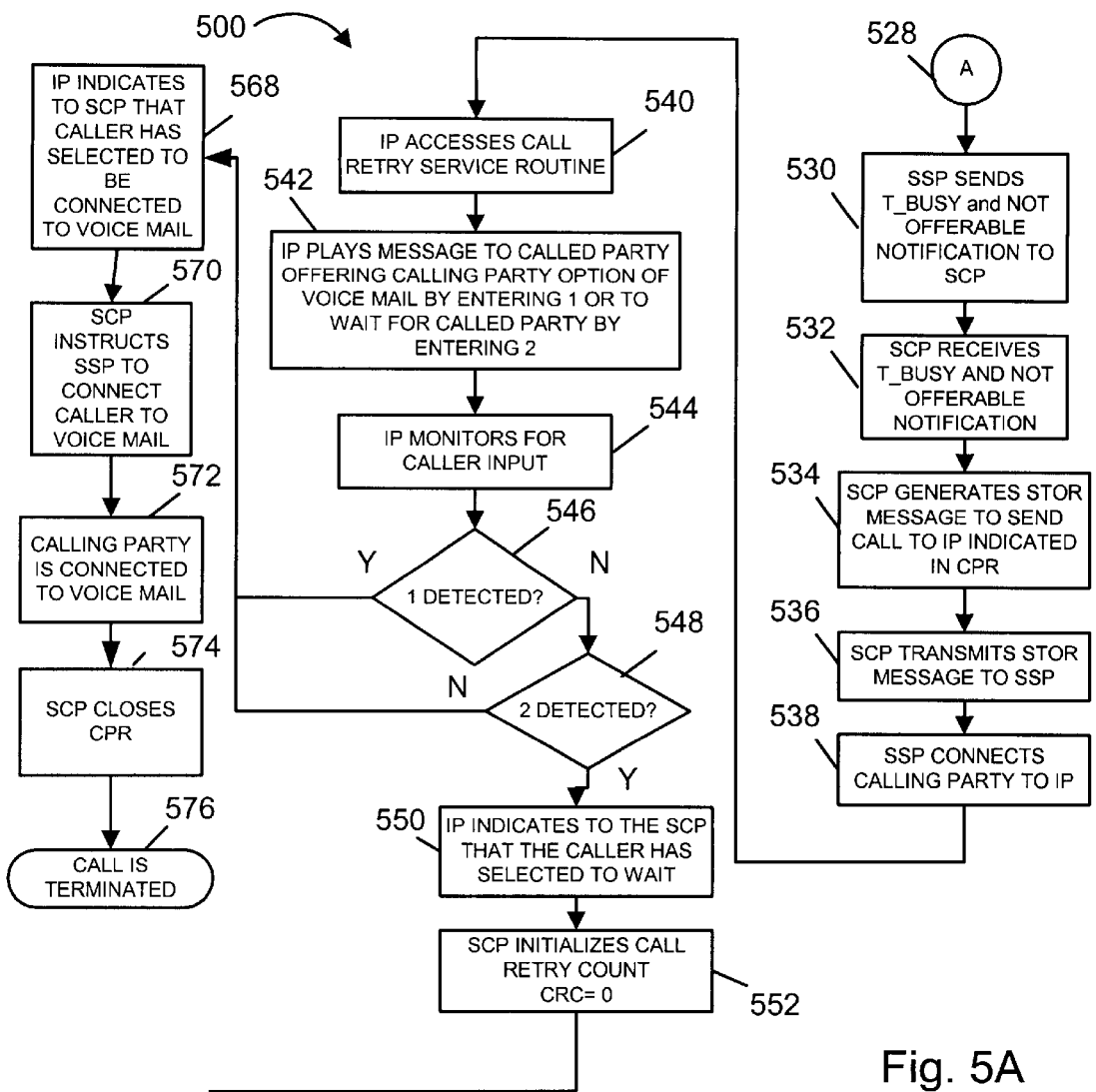
FIG. 5, which comprises the combination of FIGS. 5A and 5B, illustrates steps associated with providing the call retry service of FIG. 4.

The call retry service of the present invention will now be described in detail with reference to FIG. 5 which comprises the combination of FIGS. 5A and 5B.

The call retry service is started in step 530 by the SSP 2 sending a busy and not offerable notification to the SCP 16 after trying to complete a call. In step 532, the SCP 16 receives the busy and not offerable notification and then in step 534 the SCP 16 generates a message, e.g., a send to outside resource (STOR) message instructing the SSP 2 to connect the call to IP 10. IP 10 provides timer and message functionality used to implement the call retry service of the invention.

Following generation of the STOR message in step 536 it is transmitted by the SCP 16 to the SSP 2. In response to receiving the STOR message, in step 538, the SSP 2 connects the incoming call to the IP 10. Upon receiving the call, IP 10 executes call retry logic, e.g., routine 226. Under control of the call retry logic, the IP 10 plays a message to the calling party indicating that the called party is busy on another call and offering the calling party a voice mail option by entering 1 or to wait by entering 2.

In step 544 the IP monitors for input, e.g., a DTMF response indicating a 1 or 2 or speech indicating a 1 or 2. Upon receiving input from the caller or after a preselected period of time, operation proceeds to step 546. In step 546 the input, if any, received from the caller is examined to see if a 1 was received. if receipt of a 1 is detected in step 546, indicating that the caller has selected to be connected to voice mail, operation proceeds to step 568.

However, if a 1 is not detected in step 546, operation proceeds to step 548 wherein the received input, if any, is checked to see if a 2 was received. If a 2 is detected, indicating that the caller has chosen to wait operation proceeds to step 550. However, if a 2 is not detected, indicating that a valid response was not received, operation proceeds to step 568.

In step 568, the IP indicates, e.g., by way of SSP 2, that the caller has selected to be connected to voice mail. In response to receiving this information from the IP 10, the SCP 16 instructs the SSP 2 to connect the call to voice mail, e.g., to send the caller to IP 20. In response to the instruction from the SCP 16, the SSP sends the call to voice mail IP 20 and, in step 572 the calling party is connected to voice mail. Then, in step 574, the SCP closes the CPR and in step 576 the call is allowed to terminate in a normal manner, e.g., with the calling party hanging up after leaving a voice message on IP 10.

In step 550, where operation proceeds when the user indicates a desire to wait, the IP 10 sends information to the SCP 16 indicating that the caller has selected to wait. Next in step 552, in response to receiving this information, the SCP initializes a call retry count (CRC) to zero.

Operation proceeds from step 552 to step 556, wherein the SCP 16 accesses a line information database to retrieve the name of the calling party using automatic number identification (ANI) information, e.g., the calling party number received as part of the original TCAP message to the SCP 16. Once the calling party name information has been retrieved, the SCP 16 sends a message to the SSP instructing it to cause the text provided to the SSP on the called party's TAPI device. For example, the SCP may signal to the SSP 2 using a DISPLY_TEXT message that the message "John Jones is waiting to talk to you." should be sent to the called party. In response, the SSP 2, in step 560 transmits the text message to be displayed to the called party's computer screen via the TAPI device, e.g., computer 36 or to caller ID device 37, over the phone line being used for the existing call which resulted in the busy line condition.

In response to receiving the message, in step 562, the called party's TAPI device 36 will pass the call waiting message to the user's computer screen or the caller ID device 37 will display the message thereby notifying the called party of the waiting call. Operation proceeds from step 562 to step 564. In step 564, the SCP 16 instructs the SSP 2 to reconnect the call to the IP 10. Operation then proceeds to step 569 via connecting node D 566.

In step 569, in response to having the call returned the IP 10 starts a timer, e.g., a 20 second timer. At the end of period for which the timer was set, e.g., 20 seconds, in step 571 the IP signals to the SCP 16 to continue call processing.

In response to receiving the signal from the IP, the SCP in step 573 resumes call processing and sends a message to the SSP 2, e.g., a Monitor_For_Change message, requesting that the SSP 2 check the status of the called party's line and return that information to the SCP 16. In response to the AIN Monitor_For_Change message, the SSP 2 returns the status of the called party's line to the SCP 16.

In step 577 the SCP 16 checks the line status information returned by SSP 2 to check if the called party's line is still busy. If in step 577 it is determined that the called party's line is not busy, operation proceeds to step 578. In step 578, the SCP 16 sends a message to the SSP 2 to complete the call to the called party line allowing the called party to answer the call if desired. Then in step 582 the call is terminated in the normal manner, e.g., with either the called or calling party hanging up the phone. The SCP 16 will close the CPR associated with the call with the call's termination or at an earlier point in time after signaling the SSP 2 to complete the call to the called party line.

If in step 577 it is determined that the called party's line is busy, operation proceeds to step 586. In step 586, the SCP 16 increments the call retry count CRC by one. It then proceeds to step in step 588 to check if the call retry count, indicative of the amount of time the caller has been waiting, equals a maximum value, e.g., 4. If in step 588 it is determined that the CRC does not equal the maximum value, operation proceeds to step 592 wherein the SCP 16 instructs the SSP 2 to reconnect the call to the IP 10. Operation proceeds from step 592 to step 569 which starts the timer used to determine when the called line is to be check again.

However, if in step 588 it is determined that the CRC equals the maximum value, operation proceeds to step 590 wherein the SCP 16 instructs the SSP 2 to reconnect the call to the IP 10 and for the IP 10 to play a message indicating that the called party is still busy and that they are being sent to voice mail. For example, the message played by the IP might state: "The party you are calling is still on another call. You are being transferred to the party's voice mail."

In step 592, the IP plays the message to the caller the specified send to voice mail message. Next operation proceeds to step 570 via GOTO step 594. By way of the processing path beginning with step 570, the caller will be transferred to voice mail IP 20 and the call will be terminated in a normal manner.

Figure 5A:
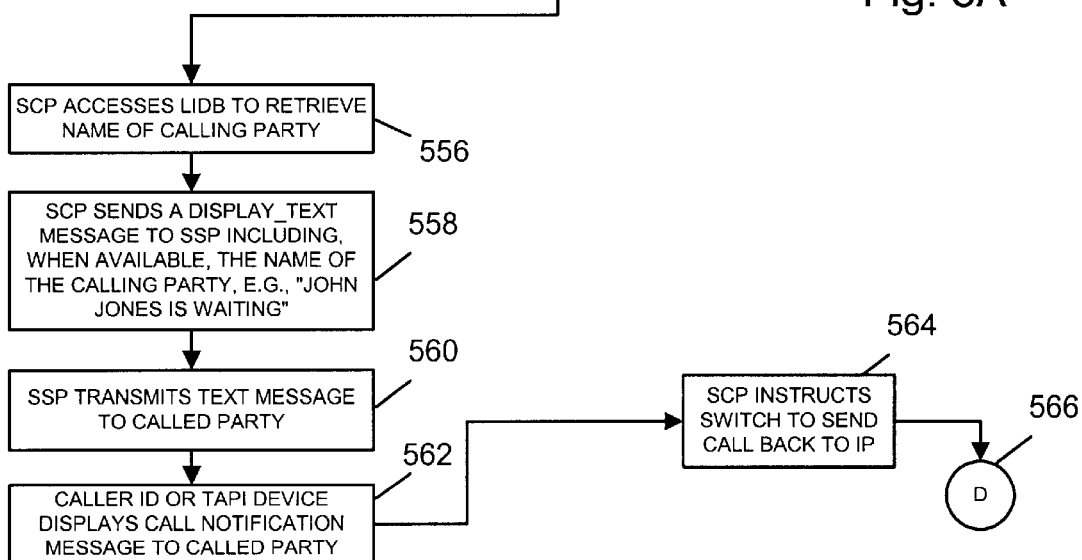
Figure 5B:
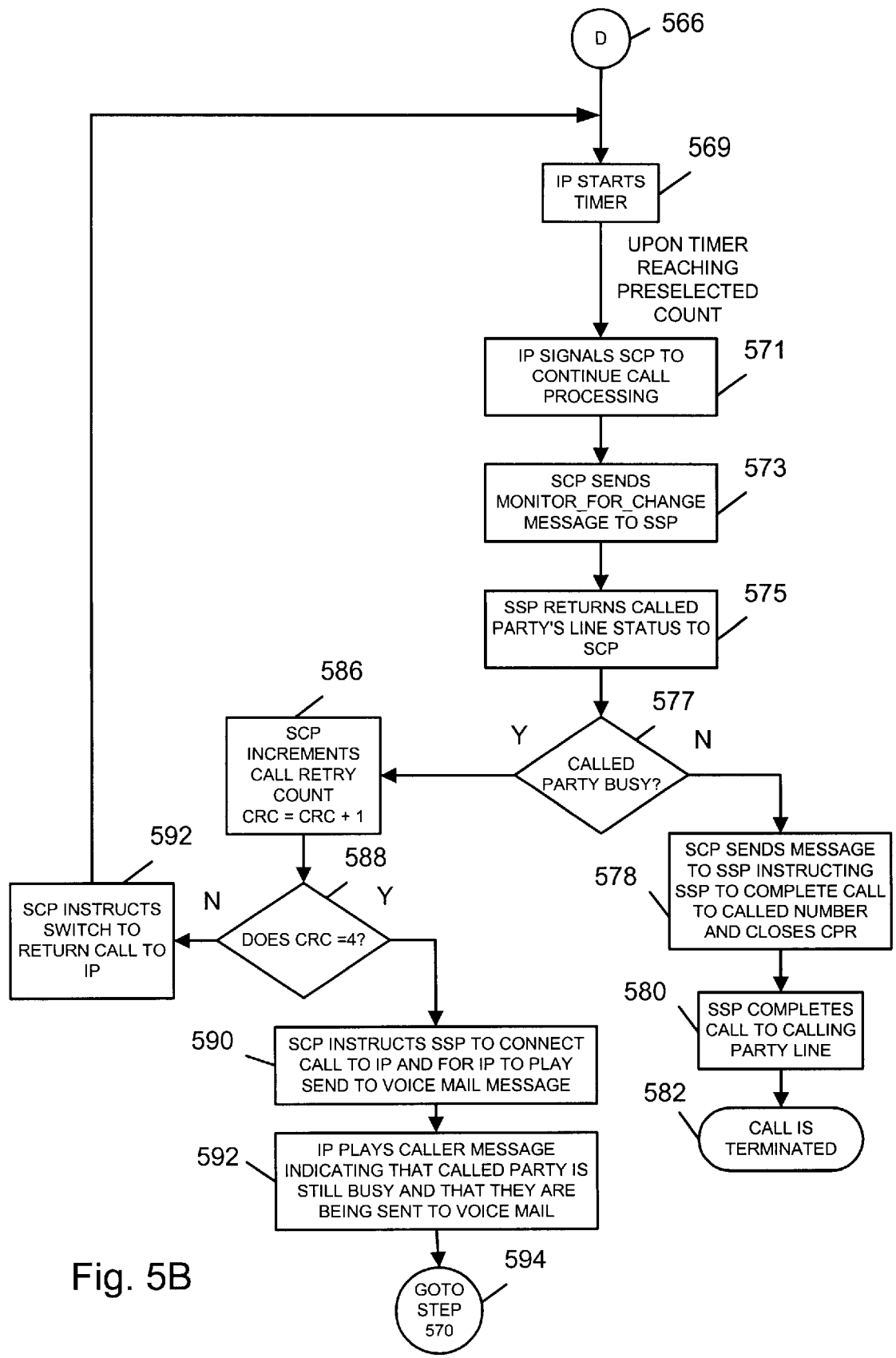

Thus, in accordance with the call retry service illustrated in FIG. 5, AIN functionality, including the AIN Monitor_For_Change message which is used by the SCP to obtain called party line status information, is used to provide a caller to a busy telephone line a chance to wait until the line is no longer busy.

Figure 6A:
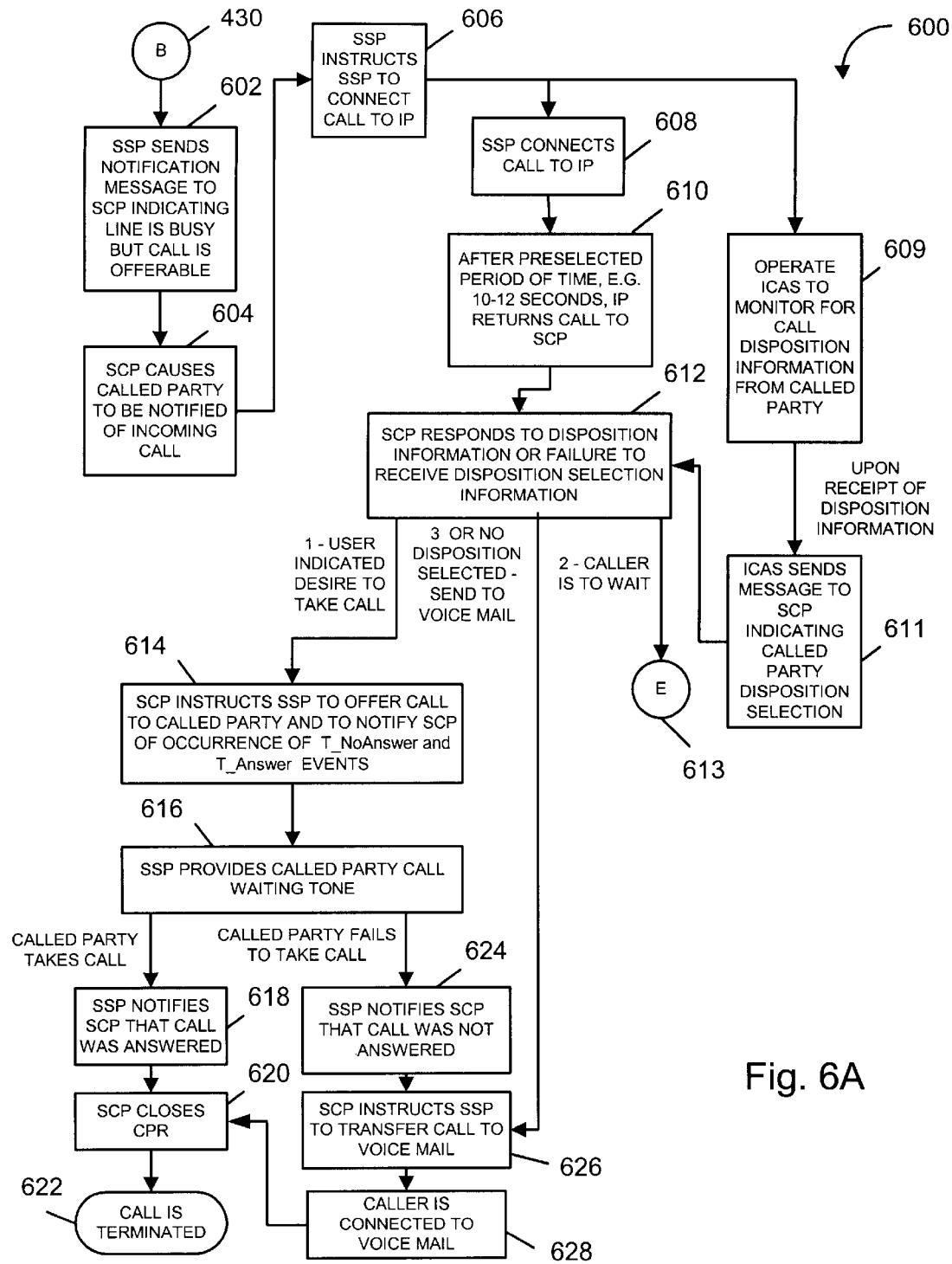
FIG. 6, which comprises the combination of FIGS. 6A and 6B, illustrates steps associated with providing the enhanced call retry service of FIG. 4.
Figure 6B:
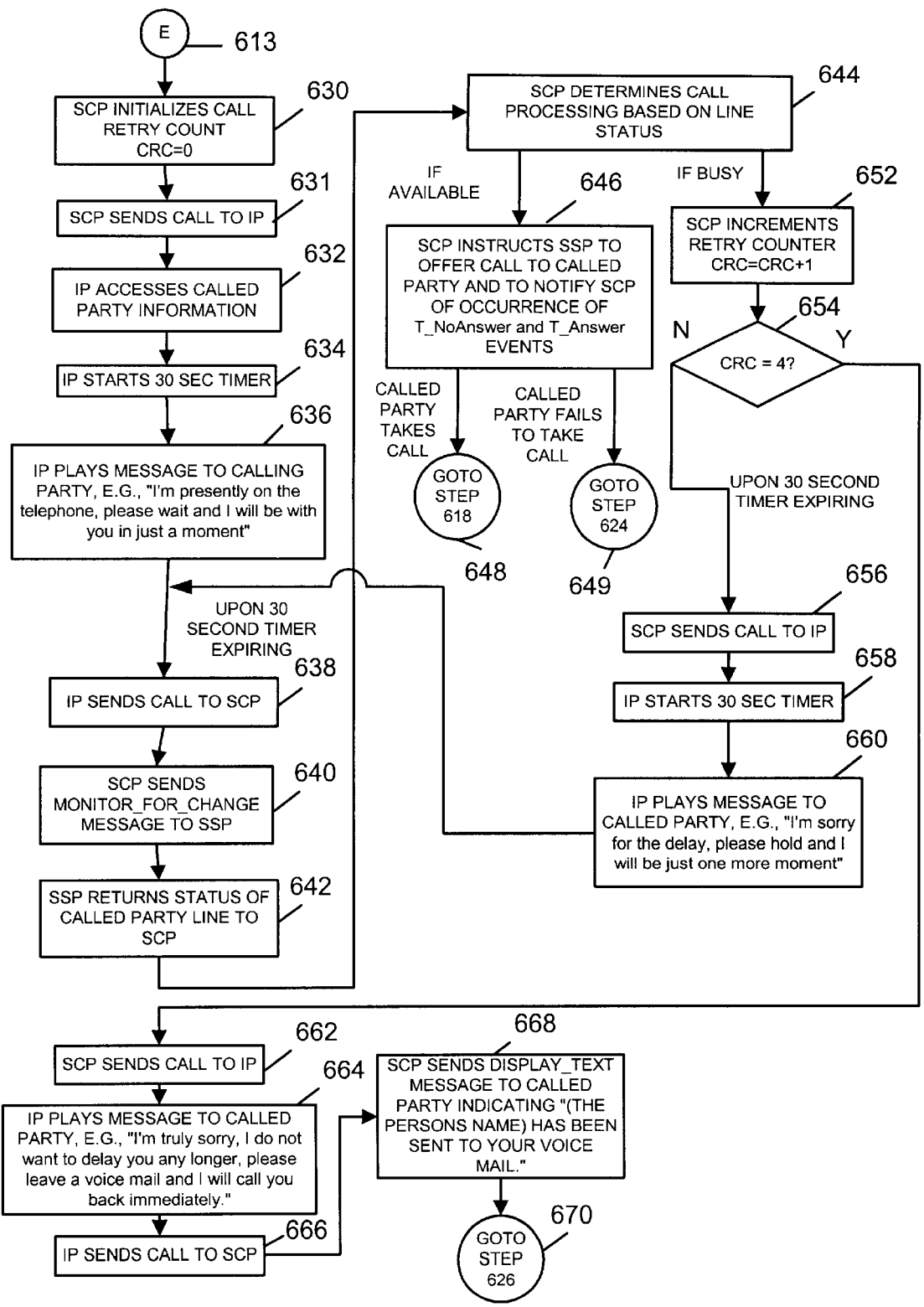

The enhanced call waiting service 600 shown in FIG. 6, which comprises the combination of FIGS. 6A and 6B, will now be described.

The enhanced call waiting service 600 beings in step 602 with the SSP 2 notifying the SSP 16 that a called party's line is busy but the call is offerable, e.g., because of the enhanced call waiting service. In response to the call offerable message from the SSP 16, the SCP 16 causes the called party to be notified of the incoming call. Step 604 may be implemented using the TAPI notification method 700 illustrated in FIG. 7 or the talking call waiting notification method 800 illustrated in FIG. 8. Both the FIG. 7 and FIG. 8 call notification methods will be discussed further below.

After the SCP 16 has initiated notification of the called party of the incoming call, operation proceeds to step 606. In step 606, the SCP 16 notifies the SSP 2 to connect the call to the IP. Call processing operation proceeds in parallel from step 606 along the paths beginning with steps 608 and 609.

In step 608, the SSP 2 connects the call to the IP 10. Then in step 610, after a timer activated by the caller being connected to the IP times out, e.g., after 10–12 seconds, the IP 10 returns the call to the SCP 16 for further call processing instructions by sending a signal to the SCP 16 to continue call processing. Thus, via step 608 and 610 a call processing delay is introduced which allows the SCP 16 time to receive call disposition information from the called party following notification of the incoming call. Operation proceeds from step 610 to step 612.

In response to receiving the incoming call notification, the called party may select to respond by selecting from a plurality of call disposition options presented as part of the incoming call notification message. The dispositions options from which the called party may choose include 1) accept call; 2) request call to wait; an 3) to send the call to voice mail. The called/party may signal his/her disposition information by using a computer 36 coupled to the Internet 30 to transmit a call disposition selection message to the ICAS 32. Such a message will normally include information identifying the call disposition selected and information identifying the called party, e.g., the called party's telephone number and IP address. Optionally the disposition message may also include calling party information (ANI information) or time information received as part of a call notification message and returned to the ACAS 32 as part of the disposition message. The inclusion of ANI DATA or time information with the disposition information avoids potential confusion regarding disposition selections relating to different calls received while a party is on a long telephone call.

In step 609, the ICAS is operated to monitor for call disposition information, e.g., disposition messages received via the Internet, from enhanced call waiting service subscribers. Upon receipt of disposition information from an enhanced call waiting service subscriber, in step 611, the ICAS 32 transmits the received disposition information to the SCP 64.

In step 612, the SCP 64 responds to call disposition information received from the ICAS 32 or the failure to receive such information after the preselected period of time determined by the IP's timer in step 610.

If disposition information was received from the enhanced call waiting service subscriber indicating that the service subscriber intends to take the incoming call, e.g., disposition option 1 was selected, operation proceeds from step 612 to step 614. In step 614 the SCP instructs the SSP 2 to offer the call to the called party and to notify the SCP 64 whether or not the call is answered. In response to the Offer_Call message from the SCP 64, in step 616 the SSP 2 provides the called party with a call waiting tone. The called party may take the call by briefly depressing and releasing the phones hook button causing the existing call to be placed on hold and the incoming call to be received. With the called party accepting the call, operation proceeds to step 618 wherein the SSP 2 notifies the SCP 64 that the offered call was answered. Operation then proceeds to step 620.

If, after being provided with the call waiting tone in step 616, the called party fails to take the call in a fixed amount of time, the SSP 2, in step 624, proceeds to notify the SCP 64 that the call was not answered. In response to the no answer notification, in step 626, the SCP 64 instructs the SSP 2 to transfer the call to voice mail. This may be done by sending a STOR message identifying voice mail IP 20 as the outside resource to which the call is to be connected. In step 628, the caller is connected to the voice mail service and then operation proceeds to step 620.

In step 620 the SCP 64 closes the CPR associated with the received call. Then, in step 622 the call is allowed to terminate in the normal fashion, e.g., with one of parties to the call hanging up after a conversation.

If in step 612, if received disposition information indicates that the called party has selected for the call to be sent to voice mail, e.g., the called party selected call disposition option 3, or no disposition information was received, operation proceeds from step 612 to step 626 resulting in the called party being sent to the called party's voice mail system.

If in step 612, the SCP 64 received call disposition information indicating that the called party wanted the caller to wait, e.g., the called party selected the second disposition option, operation proceeds from step 612 to step 630 via connecting node E 613.

In step 630, the SCP 64 initializes a call retry count (CRC) to zero. Then in step 631 the SCP 64 sends the incoming call to the IP 10, e.g., by instructing the SSP 2 to connect the call to IP 10. In step 632, the IP accesses stored information 224, 224' corresponding to the called enhanced call waiting service subscriber. This information may be identified by IP 10 matching the called telephone number to the telephone number of the call waiting service subscriber's telephone number included in information 224, 224'. The accessed subscriber information includes, e.g., one or more customized voice recordings and a message schedule indicating when various recording should be used. When custom voice recordings are not available default messages in a voice other than the called party's voice may be accessed and used by the IP 10.

From step 632 operation proceeds to step 634 wherein the IP starts a timer, e.g., a 30 sec timer, used to determine the period the caller is to wait before the called party's line status is rechecked. Then in step 636 the IP 10 plays the calling party indicating the called party is presently on the phone and requesting the caller to wait. For example, in step 636 the calling party may be played a message previously recorded by the called party stating "I'm presently on the telephone, please wait and I will be with you in just a moment." Upon the IP's timer reaching the set time limit, e.g., 30 seconds, operation proceeds to step 638 wherein the IP 10 signals to the SCP 64 to resume processing of the call.

Next, in step 640, the SCP 64 signals to the SSP 2 to check the status of the called party's line. this can be done by the SCP 64 sending a Monitor_For_Change message to the SSP 2 with the called party's telephone number. In step 642, the SSP 2 returns called party lines status information to the SCP 64. Operation then proceeds to step 644 wherein the SCP 64 determines the next call processing step as a function of the status of the called party's line.

If the called party's line is available, operation proceeds from step 644 to step 646 wherein the SCP 64 instructs the SSP 2 to present the incoming call to the called party and to report back whether the call is answered or not. If the called party accepts the call operation proceeds to step 618 via connecting step 648 wherein the calling and called party are connect. If the called party fails to accept the call, operation proceeds to GOTO step 624 via step 649 and the calling party ends up being connected to voice mail.

If in step 644 a busy line condition is encountered, operation proceeds to step 652 wherein the SCP 64 increments the call retry count by one before proceeding to step 654. In step 654 the value of the call retry count is compared to a maximum value, e.g., 4, indicative of the maximum number of wait periods are to be allowed to pass before the call is transferred to voice mail. If in step 654 it is determined that the call retry count does not equal the maximum permitted value, operation proceeds to step 656. In step 656 the SCP 64 sends the call back to the IP 10. In response to being reconnected to the call, the IP 10 restarts the 30 sec timer in step 658. Then, in step 660 the IP plays the calling party another message, e.g., apologizing for the delay and requesting the caller to continue to hold. The message might state "I'm sorry for the delay, please hold and I will be just one more moment." The message may be in the called party's voice or in another voice. Operation proceeds from step 660 once again to step 638 upon the IP's timer expiring. In this manner the call is returned to the SCP 64 which will check on the called party's line status once again.

If in step 654 the CRC is determined to equal the maximum number of, e.g., four, operation proceeds to step 662 wherein the SCP sends the call to IP 10 in preparation for forwarding to voice mail. The forwarding to the IP 10 may involve the SCP 64 specifying a message to be played to the calling party. In step 664, the IP 10 plays a message to the called party notifying the called party that the call is about to be sent to voice mail. For example, the calling party may hear the message "I'm, truly sorry, I do not want to delay you any longer, please leave a voice mail and I will call you back immediately." Once the message has been played to the caller, the IP 10 sends the call back to the SCP in step 666.

In step 668, the SCP 64 will instruct, e.g., using a Display_Text message, the SSP 2 to send a text message to the called party notifying them that the incoming call has been, or is being, sent to voice mail. Display text can be displayed on a caller ID box 37 or computer screen. For display on a caller ID box 37 the information may be scrolled. Operation proceeds from step 668 to step 670.

Via GOTO step 670 processing proceeds to step 626 wherein the SCP 64 causes the incoming call to be transferred to voice mail. From step 626, the incoming call is completed as previously discussed, e.g., with the calling party being provided the opportunity to leave a voice mail message.

Figure 7:
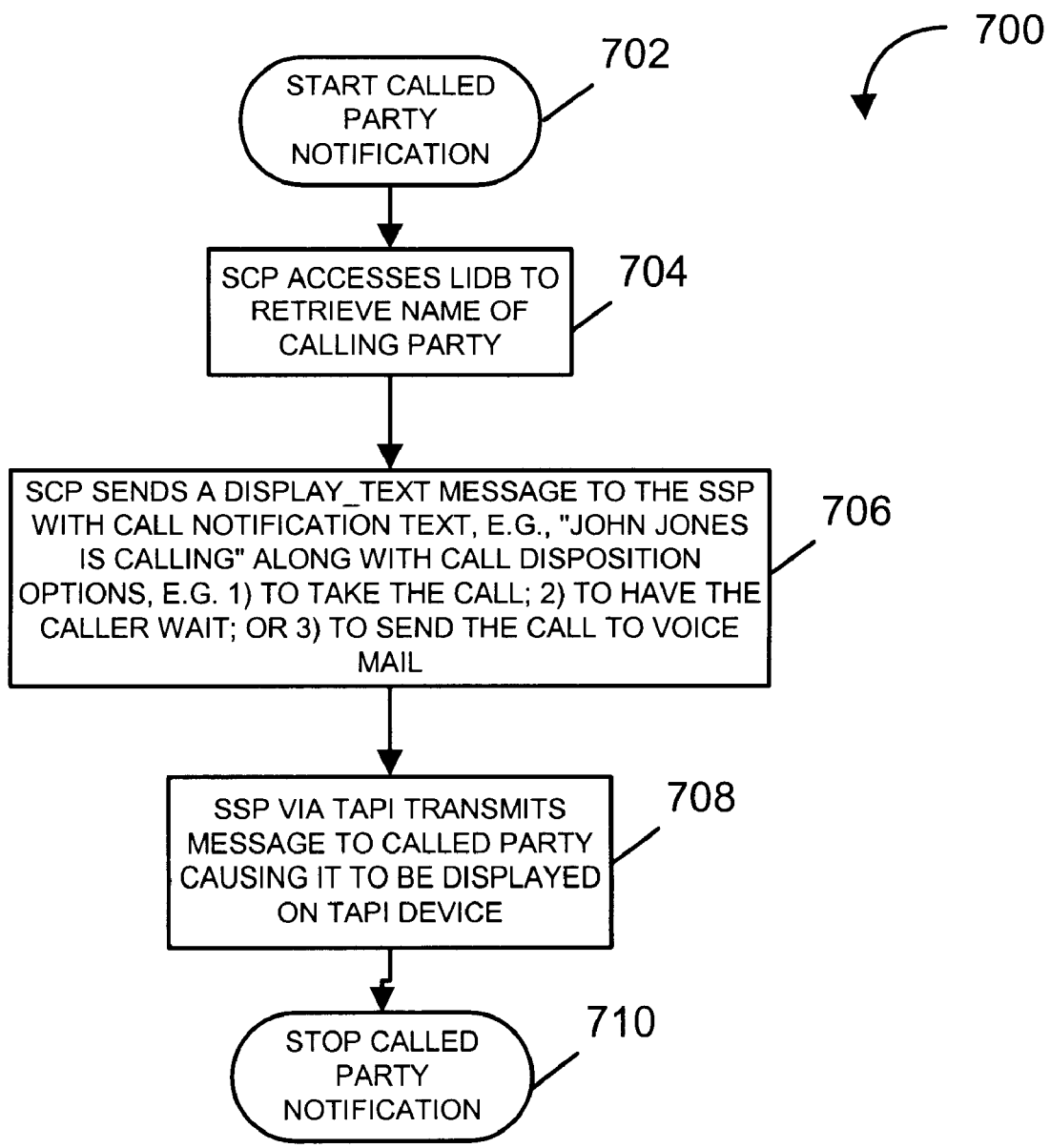
FIGS. 7 and 8 illustrate methods of notifying a called party of an incoming call in accordance with the present invention.

Called party notification processes 700 and 800, shown in FIGS. 7 and 8, which can be used to notify a called party on an existing call of an incoming call, will now be discussed.

The call notification process 700 begins in start step 702, e.g., with the SCP 64 initiating the start call notification process. Operation proceeds from start step 702 to step 704, wherein the SCP 64 accesses the LIDB to retrieve the name of the calling party based on ANI information, e.g., calling party information, included in the TCAP message received from the SSP 2. Once the calling party identification information is obtained from the LIDB, the SCP 64 controls the SSP 2 send a text message to the called party using TAPI or Caller ID or both notifying the called party of the incoming call, the calling party's identity to the extent known from the LIDB look-up operation, and presenting the called party with one or more call disposition options. The SCP 64 may use a Display_Text message to cause the SSP 2 to initiate the display of the call notification message to the called party. An exemplary call notification message may take the form "John Johns is calling. Respond by selecting one of the following call disposition options from your computer: 1) to take the call; 2) to have the caller wait; or 3) to send the call to voice mail."

Next, in step 708, the SSP 2 transmits the text message to the called party thereby resulting in the message being displayed on the enhanced call waiting service subscriber's computer 36, Caller ID or another TAPI capable device. With the call notification message having been sent to the called party, the call notification process 700 stops in step 710.

Figure 8:
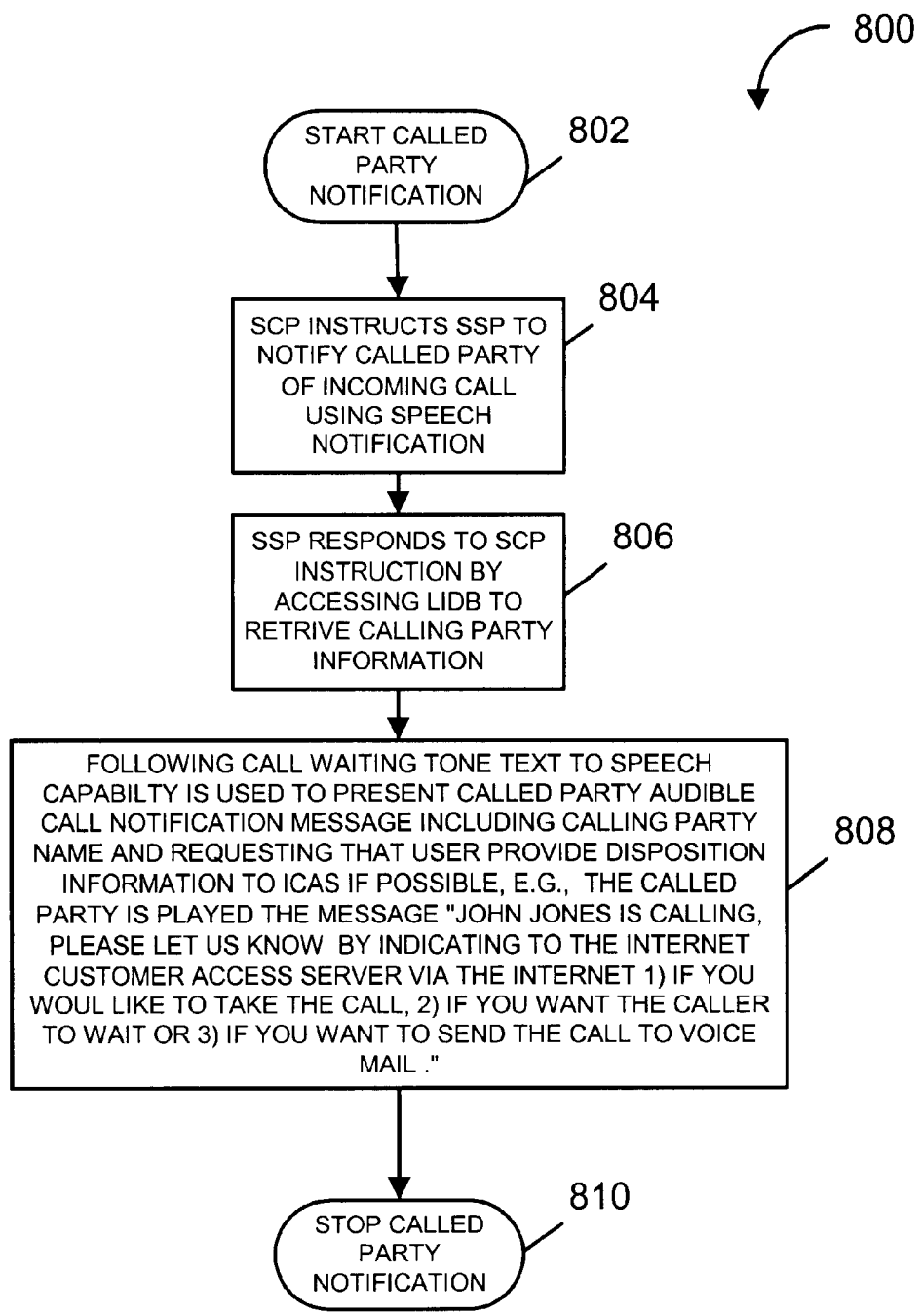

FIG. 8 illustrates an incoming call notification method which 800 uses speech notification as opposed to text notification. The utilized telephone switch (SSP) notification functionality is the same as, or similar to, the existing call notification functionally used to provide existing talking call waiting customers voice notifications of incoming calls. However, unlike the existing talking call waiting notification, the notification provides the called party a list of disposition options that they can select from, e.g., via an Internet call disposition message to the ICAS 32.

The process 800 starts in START step 802 with the SCP 64 initiating the incoming call notification process. In step 804 the SCP sends a message to the SSP which invokes the SSP's speech based call notification capability. In response to the message from the SCP 64, in step 806, the SSP 2 accesses LIDB to retrieve calling party name information. Once the name information is retrieved, operation proceeds to step 806 wherein the SSP 2 briefly interrupts the existing call and provides the called party the incoming call notification message using, e.g., text to speech functionally, which allows the called party to hear an audio version of the calling party's name. The message may follow a call waiting tone and may state, e.g., "John Jones is calling, please let us know by indicating to the Internet customer access server via the Internet 1) if you would like to take the call, 2) if you want the caller to wait or 3) if you want to send the call to voice mail." Following playing of the notification message in step 808, the call notification process 800 is stopped in step 810.

While the enhanced call waiting service of the present invention has been described in the context of an exemplary embodiment where the called party is provided an opportunity to provide call disposition instruction over the Internet, the call disposition information could be communicated back to the SCP 64 and or IP 10 in other ways. In addition, while TAPI and voice incoming call notifications have been described as exemplary notification techniques, other techniques, e.g., messages sent to the called party over the Internet, may be used to notify the called party of an incoming call.

In addition, in various embodiments the retry features of the present invention can be limited so that calls directed to lines where the call is not offerable, e.g., because the called party does not have call waiting or is already involved in multiple phone calls, are transferred directly to voice mail without being offered the opportunity to wait for the called party to become available to take the call.

Numerous variations on the above described methods and apparatus are possible without departing from the scope of the invention.

What is claimed is:

1. A method of servicing an incoming call directed to a telephone line which is busy with an ongoing call, the method comprising the steps of:

operating a service control point to periodically check the called party line status by requesting a telephone switch to provide information on the status of said telephone line;

operating the service control point to receive from the telephone switch the requested status information on said telephone line;

operating the service control point to maintain a counter including a count indicative of the number of times the called party line status has been checked; and in response to the service control point receiving from the telephone switch status information indicating that said telephone line is not busy, operating the service control point to control the telephone switch to complete the incoming call to said telephone line.

2. The method of claim 1, wherein the step of operating a service control point to periodically request a telephone switch to provide information on the status of said telephone line includes:

sending an advanced intelligent network Monitor_For_ Change message to the telephone switch.

3. The method of claim 2, further comprising:

between each of the periodic requests made by the service control point to the telephone switch, to provide information on the status of said telephone line, connecting the incoming call to a peripheral device.

4. The method of claim 3, further comprising: connecting the calling party to a voice mail device when said maintained count reaches a set value greater than one.

5. The method of claim 4, further comprising:

operating the voice mail device to provide the caller the opportunity to leave a message for the called party.

6. The method of claim 2, further comprising:

sending a message to a called party to whom the incoming call is directed informing the called party during the ongoing call that there is an incoming call.

7. The method of claim 6, wherein the step of sending a message includes:

operating the telephone switch to send a text message using telephone application protocol interface signaling over said telephone line.

8. The method of claim 7, further comprising:

using automatic number identification information included in the incoming call to access a database including calling party name information; and including the name of the calling party in the text message sent to the called party.

9. The method of claim 4, further comprising:

notifying the called party that the incoming call was sent to voice mail.

10. A method of servicing an incoming call directed to a telephone line which is busy with an ongoing call, the method comprising the steps of:

operating a service control point to periodically request a telephone switch to provide information on the status of said telephone line;

operating the service control point to receive from the telephone switch the requested status information on said telephone line;

in response to the service control point receiving from the telephone switch status information indicating that said telephone line is not busy, operating the service control point to control the telephone switch to complete the incoming call to said telephone line;

between each of the periodic requests made by the service control point to the telephone switch, to provide information on the status of said telephone line, connecting the incoming call to a peripheral device; and during at least one of the times the incoming call is connected to the peripheral device, offering to the caller the opportunity to be connected to voice mail; and when said caller selects to be connected to voice mail, connecting the caller to a voice mail device.

11. The method of claim 8, wherein said voice mail device is a different peripheral device from said peripheral device to which the incoming call is connected when the caller is offered the opportunity to be connected to voice mail.

12. The method of claim 11, further comprising:

operating the voice mail device to provide the caller the opportunity to leave a message for the called party.

13. A method of processing a call from a caller to a called telephone line in a communications network including a service control point and a telephone switch, the method comprising the steps of:

i. operating the service control point to request information from the telephone switch regarding the status of the called;

ii. operating the service control point to receive line status information from the telephone switch; and in response to the service control point receiving line status information indicating the called telephone line is not busy, controlling the telephone switch to try to complete the call to the called telephone line;

in response to the service control point receiving line status information indicating the called telephone line is busy, waiting a period of time before repeating steps i and ii; and wherein the act of waiting a period of time before repeating steps i and ii further includes:

connecting the caller to a peripheral device; and operating the peripheral device to play a message to the caller offering the caller the opportunity to be transferred to voice mail.

14. The method of claim 13, further comprising:

prior to performing steps i or ii, detecting at the telephone switch activation of a terminating attempt trigger set on the called telephone line; and operating the telephone switch to send a query to the service control point for call processing instructions in response to activation of said terminating attempt trigger.

15. The method of claim 14, further comprising:

prior to performing steps i or ii, in response to a message received from the service control point, operating the telephone switch to attempt to complete the call to the called telephone line; and reporting to the service control point if the call is answered or encounters a busy condition.

16. The method of claim 15, further comprising:

notifying the called party of an incoming call while the called party is on an existing call which resulted in the busy condition.

17. A method of servicing an incoming call directed to a called party, the method comprising:

operating a trigger set at a telephone switch to detect the call;

in response to the trigger detecting the call, sending a request for call processing instructions to a service control point;

operating the service control point to initiate notification of the called party of the incoming call;

operating a server coupled to the Internet to monitor for call disposition information from the called party indicating how the called party wants the incoming call to be handled; and after at least one of i) the server receiving disposition information from the caller and ii) a set period of time expiring, operating the service control point to control processing of the call in accordance with disposition information received over the Internet or, in the absence of receiving such disposition information, in a selected default manner.

18. The method of claim 17, further comprising:

notifying the called party of the incoming call by supplying a text notification message using TAPI signaling.

19. The method of claim 17, wherein received call disposition information indicates that the called party wants to caller to wait until an ongoing call is completed; and wherein operating the service control point to control processing of the call includes:

operating the service control point to periodically request the telephone switch to provide information on the status of said telephone line;

operating the service control point to receive from the telephone switch the requested status information on said telephone line; and in response to the service control point receiving from the telephone switch status information indicating that said telephone line is no longer busy, operating the service control point to control the telephone switch to complete the incoming call to said telephone line.

20. The method of claim 19, wherein operating the service control point to periodically request the telephone switch to provide information on the status of said telephone line includes:

periodically operating the service control point to transmit an advanced intelligent network (AIN) Monitor_For_Change message to the telephone switch.

21. The method of claim 17, wherein received call disposition information indicates that the called party is wiling to accept the incoming call; and wherein operating the service control point to control processing of the call includes:

operating the service control point to instruct the telephone switch to offer the call to the called party.

22. A service control point for providing a call retry service for a call directed to a busy telephone line, the service control point including:

means for periodically requesting a telephone switch to provide information on the status of said telephone line;

means for receiving from the telephone switch the requested status information on said telephone line; and means for incrementing a counter each time the requested status information indicates that said telephone line is busy; and means for controlling the telephone switch to complete the incoming call to said telephone line when the received status information indicates that the telephone line is not busy.

23. The service control point of claim 22, wherein said means for periodically requesting a telephone switch to provide information on the status of said telephone line includes control logic in a call processing record used to generate an advanced intelligent network Monitor_For_Change message.

* * * * *